(12) United States Patent
Wandzel et al.

(10) Patent No.: US 11,897,140 B2
(45) Date of Patent: Feb. 13, 2024

(54) SYSTEMS AND METHODS FOR OPERATING ROBOTS USING OBJECT-ORIENTED PARTIALLY OBSERVABLE MARKOV DECISION PROCESSES

(71) Applicant: BROWN UNIVERSITY, Providence, RI (US)

(72) Inventors: Arthur Richard Wandzel, Orchard Lake, MI (US); Stefanie Tellex, Providence, RI (US)

(73) Assignee: BROWN UNIVERSITY, Providence, RI (US)

( * ) Notice: Subject to any disclaimer, the term of this patent is extended or adjusted under 35 U.S.C. 154(b) by 488 days.

(21) Appl. No.: 17/280,365

(22) PCT Filed: Sep. 27, 2019

(86) PCT No.: PCT/US2019/053539
§ 371 (c)(1),
(2) Date: Mar. 26, 2021

(87) PCT Pub. No.: WO2020/117358
PCT Pub. Date: Jun. 11, 2020

(65) Prior Publication Data
US 2021/0347046 A1    Nov. 11, 2021

Related U.S. Application Data

(60) Provisional application No. 62/737,588, filed on Sep. 27, 2018.

(51) Int. Cl.
*G06N 7/01* (2023.01)
*B25J 9/16* (2006.01)

(52) U.S. Cl.
CPC .............. *B25J 9/1661* (2013.01); *G06N 7/01* (2023.01)

(58) Field of Classification Search
CPC ...... B25J 9/1661; B25J 9/1656; B25J 9/1602; G06N 7/01; G06N 7/00
See application file for complete search history.

(56) References Cited

U.S. PATENT DOCUMENTS

| 8,655,822 B2 | 2/2014 | Levchuk et al. |
| 9,047,423 B2 | 6/2015 | Tesauro et al. |

(Continued)

OTHER PUBLICATIONS

Q. Wang et al., "Retrieval of Misplaced Items Using a Mobile Robot via Visual Object Recognition," 2017 IEEE 7th Annual International Conference on CYBER Technology in Automation, Control, and Intelligent Systems (CYBER), Honolulu, HI, USA, 2017, pp. 1188-1193, doi: 10.1109/CY (Year: 2017).*

(Continued)

*Primary Examiner* — Jeff A Burke
*Assistant Examiner* — Joshua Alexander Garza
(74) *Attorney, Agent, or Firm* — Adler Pollock & Sheehan P.C.

(57) ABSTRACT

A system and method of operating a mobile robot to perform tasks includes representing a task in an Object-Oriented Partially Observable Markov Decision Process model having at least one belief pertaining to a state and at least one observation space within an environment, wherein the state is represented in terms of classes and objects and each object has at least one attribute and a semantic label. The method further includes receiving a language command identifying a target object and a location corresponding to the target object, updating the belief associated with the target object based on the language command, driving the mobile robot to the observation space identified in the updated belief, searching the updated observation space for each instance of the target object, and providing notification upon completing the task. In an embodiment, the task is a multi-object search task.

20 Claims, 9 Drawing Sheets

(56) References Cited

U.S. PATENT DOCUMENTS

| | | | |
|---|---|---|---|
| 9,870,532 | B2 | 1/2018 | Horvitz et al. |
| 9,956,687 | B2 | 5/2018 | Florencio et al. |
| 10,427,306 | B1* | 10/2019 | Quinlan ................. B25J 11/008 |
| 10,754,343 | B2* | 8/2020 | Witt ....................... G06Q 10/08 |
| 2015/0178293 | A1 | 6/2015 | Chrysanthakopoulos |
| 2017/0161626 | A1 | 6/2017 | Helander et al. |
| 2018/0079081 | A1* | 3/2018 | Chen ..................... B25J 9/0003 |
| 2018/0197100 | A1 | 7/2018 | Koseki et al. |
| 2018/0209815 | A1 | 7/2018 | Chung et al. |
| 2018/0307779 | A1 | 10/2018 | Tellex et al. |
| 2018/0311819 | A1 | 11/2018 | Thomas et al. |
| 2021/0191506 | A1* | 6/2021 | Wang ..................... G06F 3/017 |

OTHER PUBLICATIONS

5) Diuk, Carlos et al. "An object-oriented representation for efficient reinforcement learning." International Conference on Machine Learning (2008). (Year: 2008).*

6) S. Ji, R. Parr and L. Carin, "Nonmyopic Multiaspect Sensing With Partially Observable Markov Decision Processes," in IEEE Transactions on Signal Processing, vol. 55, No. 6, pp. 2720-2730, Jun. 2007, doi: 10.1109/TSP.2007.893747. (Year: 2007).*

International Search Report and Written Opinion received in International Application No. PCT/US2019/053539 dated Jun. 19, 2020, 8 pages.

Wandzel et al., "Multi-Object Search using Object-Oriented POMDPs", International Conference on Robotics and Automation (ICRA), May 20-24, 2019, pp. 7195-7200.

* cited by examiner

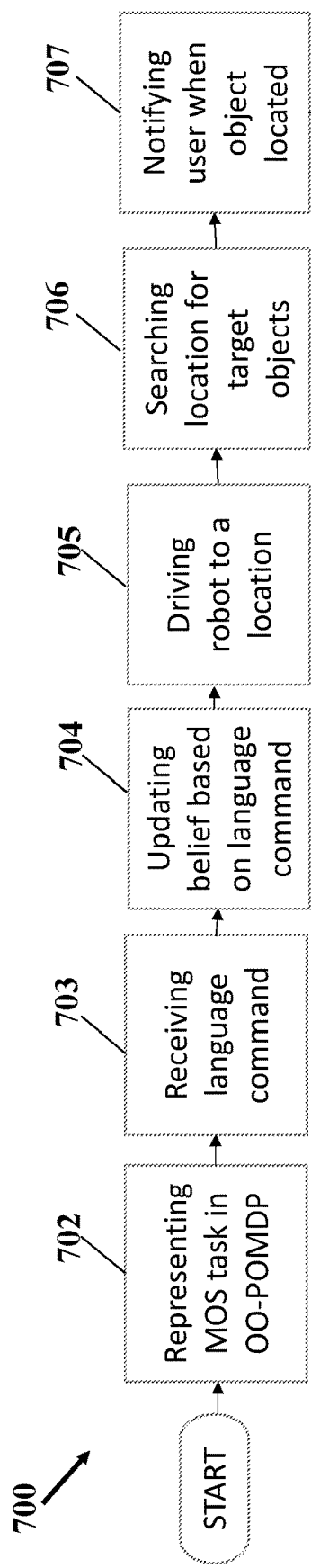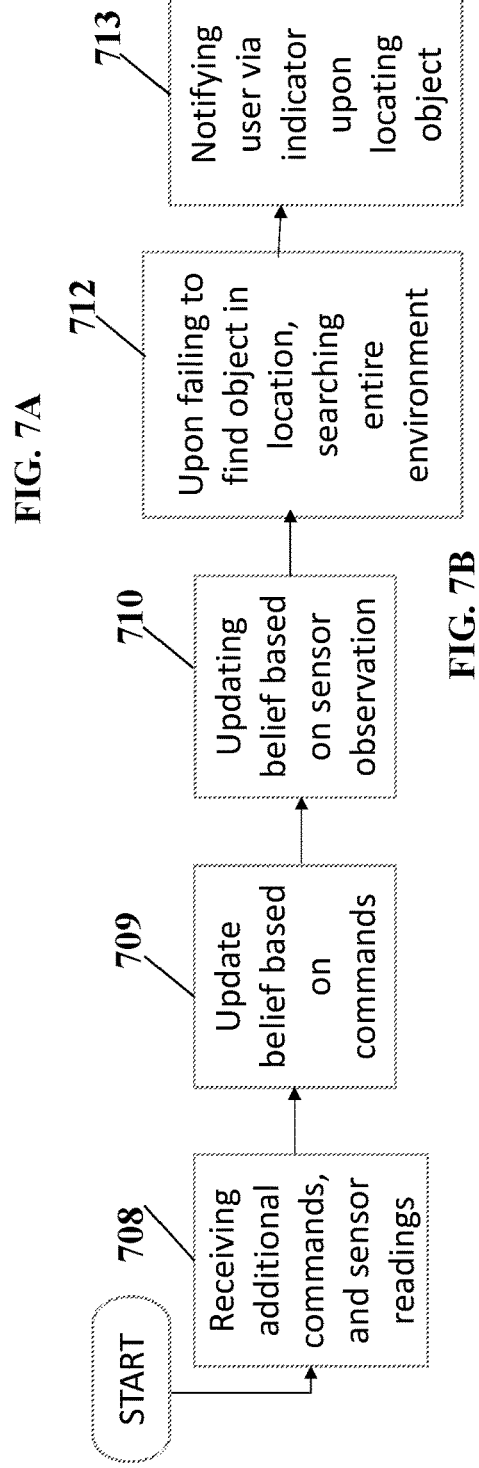
FIG. 7A
FIG. 7B

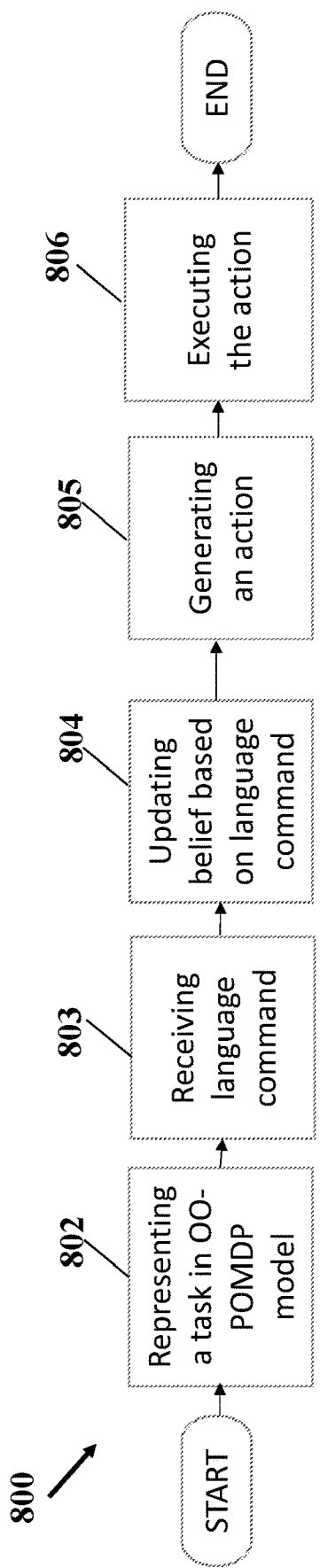
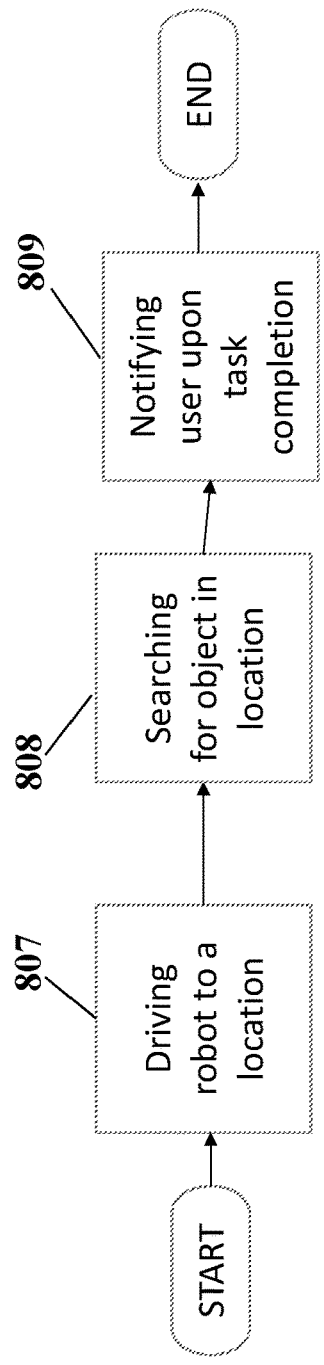
FIG. 8A
FIG. 8B

SYSTEMS AND METHODS FOR OPERATING ROBOTS USING OBJECT-ORIENTED PARTIALLY OBSERVABLE MARKOV DECISION PROCESSES

CROSS REFERENCE TO RELATED APPLICATIONS

This application is a national phase filing under 35 U.S.C. § 371 of International Application No. PCT/US2019/053539 filed Sep. 27, 2019, which claims priority from U.S. Provisional Patent Application No. 62/737,588, filed Sep. 27, 2018, the entire contents of which are hereby incorporated by reference herein.

STATEMENT REGARDING GOVERNMENT INTEREST

This invention was made with government support under U.S. Pat. No. 1,637,614 and IIS-awarded by the National Science Foundation, W911NF-10-2-0016 and D15AP00102 awarded by DARPA, and NNX16AR61G awarded by the National Aeronautics and Space Administration, and with fellowship support from the Croucher Foundation. The government has certain rights in the invention.

FIELD OF THE INVENTION

The present invention relates generally to robotic systems and, more specifically, to robots performing search tasks under uncertainty using object-oriented Partially Observable Markov Decision Processes.

BACKGROUND OF THE INVENTION

Robots are used to perform tasks traditionally considered tedious, time-consuming, or dangerous. In real-world environments, robots attempt to reason about multiple objects under uncertainty as a direct consequence of operating with lack of knowledge of the full state of the environment or with imprecise sensors or actuators. For example, a rescue robot may be tasked to find all human survivors in a disaster site. A service robot, on the other hand, may be tasked to find all toys in a living room to clean up a house. In both scenarios, there is uncertainty regarding the locations of the objects (i.e., survivors, toys). Existing approaches provide a means for sequential decision making under uncertainty, but are largely insufficient and computationally intractable for planning in large domains.

TERMS

The term "Agent" means an intelligent software program operating and deciding
actions of a robot.
The term "MOS" means Multi-Object Search.
The term "POMDP" means Partially Observable Markov Decision Process.
The term "OO-POMDP" means Object-Oriented Partially Observable Markov
Decision Process.
The term "OO-POMCP" means Object-Oriented Partially Observable Monte Carlo
Planning.
The term "OO-MDP" means Object-Oriented Markov Decision Process.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In one aspect, the present invention features a method of operating a mobile robot to conduct a multi-object search task within an environment. The mobile robot can include at least one processor that can execute computer readable instructions stored in at least one non-transitory computer readable storage medium to perform various operations including: (1) representing a multi-object search task in an Object-Oriented Partially Observable Markov Decision Process model having at least one belief pertaining to a state and at least one observation space within an environment of the robot, wherein the state is represented in terms of classes and objects and each object has at least one attribute and a semantic label; (2) receiving, at the mobile robot from a user, a language command identifying at least one target object and at least one location corresponding to the target object; (3) updating the at least one belief, associated with the at least one target object, based on the language command; (4) driving the mobile robot to the at least one observation space identified in the updated belief, (5) searching, using at least one sensor on the mobile robot while traversing the at least one observation space identified in the updated belief, for the at least one target object; and (6) notifying the user upon finding the at least one target object.

In another aspect, the present invention provides a system that includes a mobile robot having at least one processor configured to execute computer readable instructions, which can be stored in at least one non-transitory computer readable storage medium to perform a multi-object search task. The system can further include a representation of a multi-object search task in an Object-Oriented Partially Observable Markov Decision Process model having at least one belief that pertains to a state and at least one observation space within an environment of the robot. The state can be represented in terms of classes and objects and each object can include at least one attribute and a semantic label. A command module can be communicatively coupled to at least one of the processors and can be configured to receive, from a user, a language command identifying at least one target object and at least one location corresponding to the target object. An update module can be communicatively coupled to at least one of the processors and can be configured to update the belief, associated with the at least one target object, based on the language command. A drive module can be coupled to the mobile robot and configured to enable driving the mobile robot to the at least one observation space identified in the updated belief. At least one sensor can be coupled to the mobile robot to enable searching for the at least one target objects, while the mobile robot is traversing the observation space identified in the updated belief. Each sensor can be configured to provide a sensor signal to the at least one processor upon finding the at least one target object. A notification module can be communicatively coupled to the processor and at least one sensor, and configured to notify the user upon finding the at least one target object.

In another aspect, the present invention provides a method of operating a mobile robot to conduct a task within an environment. The mobile robot can include at least one processor that can execute computer readable instructions stored in at least one non-transitory computer readable storage medium to perform the following operations: (1) representing a task in an Object-Oriented Partially Observable Markov Decision Process model having at least one belief pertaining to a state and at least one observation space within an environment of the robot. The state can be represented in terms of classes and objects and each object has at least one attribute and a semantic label; (2) receiving, at the mobile robot from a user, a language command identifying at least one target object and at least one location corresponding to the target object; (3) updating the at least one belief, associated with the at least one target object, based on the language command; (4) generating at least one action using the language command and the updated belief, and (5) executing the at least one action.

In another aspect, the present invention provides a computer program that can be stored on at least one non-transitory computer readable medium, and the computer program can be configured to operate a robot. When the computer program is executed by at least one processor on a robot, the computer program causes the robot to perform various operations including: (1) storing at least one belief pertaining to a state and at least one observation space within an environment of the robot, wherein the state is represented in terms of classes and objects and each object has at least one attribute and a semantic label; (2) receiving from a user a language command identifying at least one target object and at least one location corresponding to the target object; (3) updating the at least one belief, associated with the at least one target object, based on the language command; (4) driving the mobile robot to the at least one observation space identified in the updated belief, (5) searching, using at least one sensor on the mobile robot while traversing the at least one observation space identified in the updated belief, for the at least one target object; and (6) notifying the user upon finding the at least one target object.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The present invention will be more fully understood by reference to the following detailed description and accompanying drawings, wherein:

FIG. 7A is a flow diagram illustrating an aspect of the present invention.

FIG. 7B is another flow diagram illustrating another aspect of the present invention.

FIG. 8A is a flow diagram illustrating an aspect of the present invention.

FIG. 8B is another flow diagram illustrating another aspect of the present invention.

DETAILED DESCRIPTION

Figure 1C:
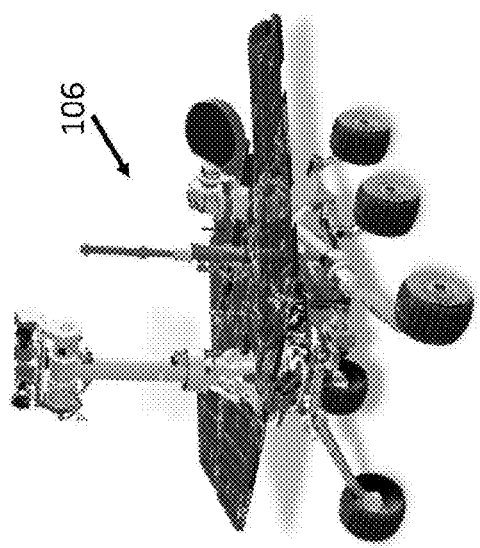
FIGS. 1A, 1B, 1C, and 1D illustrate exemplary embodiments of a mobile robot configured in accordance with an embodiment of the present invention.
Figure 1B:
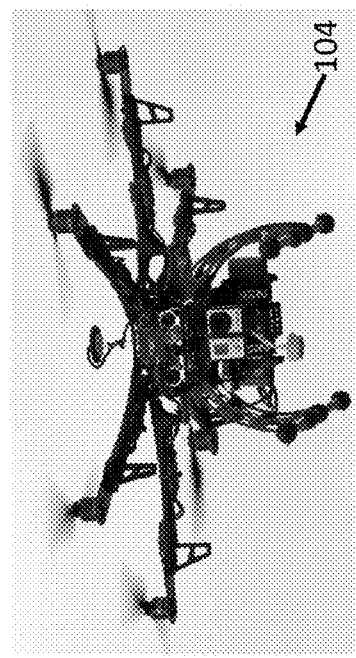
Figure 1D:
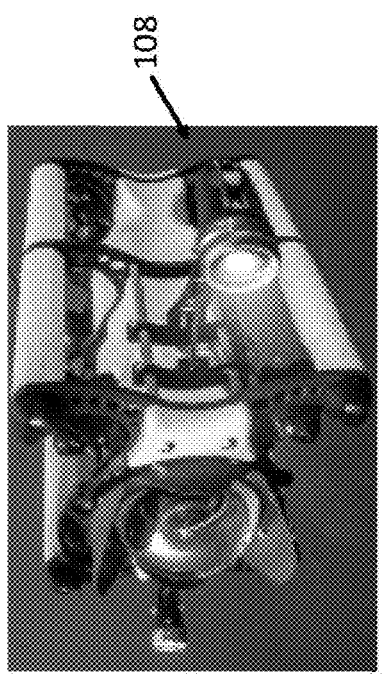
Figure 1A:
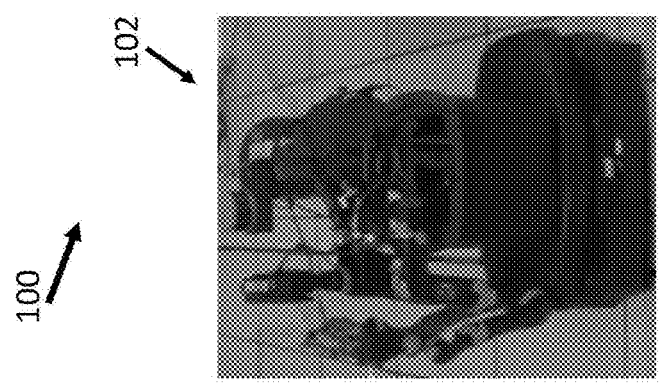

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

Generally, the present invention provides systems and methods for operating a robot to perform various tasks that can be defined in an object-oriented framework, for instance, tasks that manipulate or navigate with objects.

In one aspect, the present invention provides a system and method for operating a mobile robot to solve a multi-object search (MOS) task without prior knowledge of where the objects are located within an environment. The MOS task can be defined in a new framework called an Object-Oriented Partially Observable Markov Decision Process (OO-POMDP). Object-based reasoning provides a means of supporting rich interactions between a robot and its environment. An OO-POMDP supports convenient representation of robotic tasks that require reasoning about multiple objects under uncertainty. Sources of uncertainty can include noise in sensors and actuators, highly dynamic environments, and not fully observable environments. An OO-POMDP can represent the state and observation spaces in terms of classes and objects, and each object can have attributes and a semantic label (e.g., a "cup" label). The additional structure afforded by OO-POMDPs supports reasoning about each object independently, while also providing a means for grounding language commands from a human on task onset. In other words, language can be used as a source of information to reduce object uncertainty. A human, for example, may issue an initial command such as "Find the mugs in the kitchen and books in the library," and a robot can then associate the locations (i.e., kitchen, library) to each object class (i.e., mugs, books) so as to improve its search. In various embodiments, additional language commands from a human can be provided to and accepted by the robot anytime during performance of the task, thereby improving the search in real-time.

Moreover, in an embodiment, the OO-POMDP framework allows the robot to recover from lies or mistakes in what a human tells it. If the human operator tells the robot "Find the mug in the kitchen," the robot will first look in the kitchen for the object (i.e., mug). But after failing to find it in the kitchen, the robot will then systematically search the rest of the environment. In an embodiment, the present invention utilizes an OO-POMCP inference algorithm that allows the robot to quickly and efficiently use all the information it has to find the object. OO-POMCP extends POMCP, a well-known online planning algorithm for large domains. The present invention utilizes OO-POMCP with grounded language commands for solving challenging MOS tasks, such as, applications for search & rescue robots and home/consumer robots.

Referring to FIGS. 1A-1D, the present invention provides a system that includes a mobile robot 100 capable of performing various tasks. In various embodiments, the mobile robot 100 can be configured as an autonomous or semi-autonomous, search and rescue robot or service robot 102, a drone 104, a rover robot 106, or an underwater robot 108, or any combination of these robots. In an embodiment, the mobile robot 100 is a Kinova MOVO mobile robot.

Figure 2:
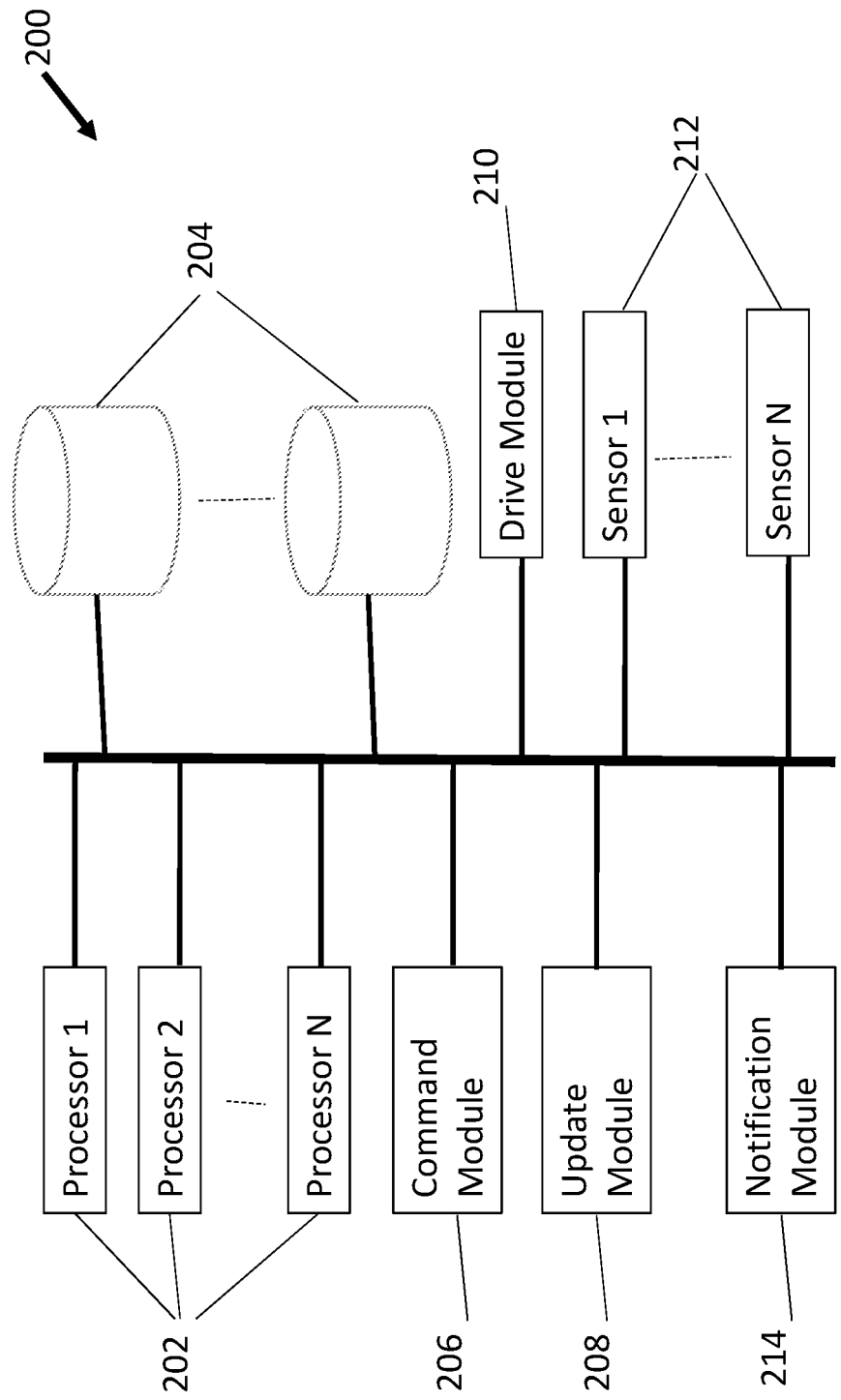
FIG. 2 illustrates an exemplary system architecture configured in accordance with an embodiment of the present invention.

Referring to FIG. 2, in an embodiment, the mobile robot 100 includes a system architecture 200 having at least one processor 202 that can be configured to execute computer readable instructions to perform a task, such as a multi-object search task. The computer readable instructions can be stored in at least one database or non-transitory computer readable storage medium 204.

Figures 3A, 3B:
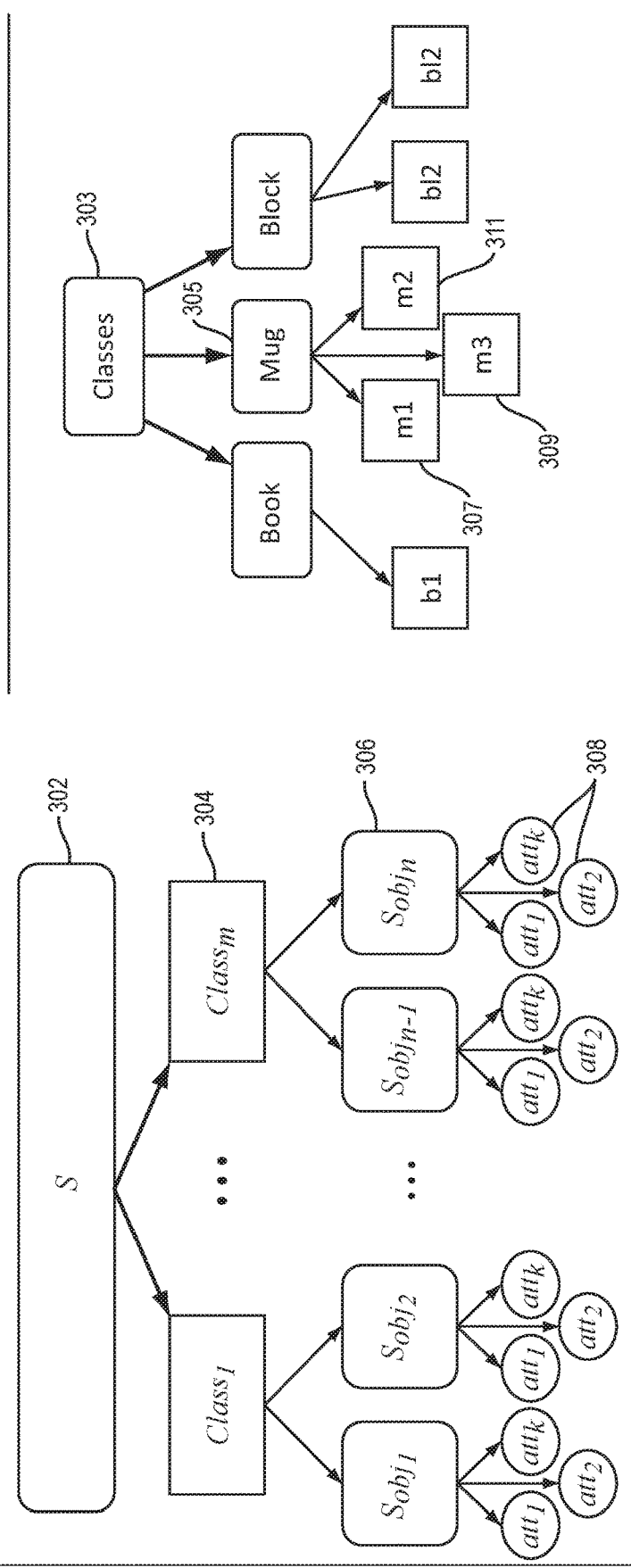
FIGS. 3A and 3B illustrate an exemplary representation in terms of states, classes, objects and attributes for use with an embodiment of the present invention.

The system can further include a modifiable representation of the MOS task in an OO-POMDP model or framework having at least one belief, which pertains to a state and at least one observation space within an environment encompassing the mobile robot. As shown in FIG. 3A, the state 302 can be represented in terms of classes 304 and objects 306, and each object 306 can include at least one attribute 308 and a semantic label (e.g., book, mug). For example, and with reference to FIG. 3B, class 303 has three object instances (i.e., Book, Mug, Block) including object 305 having a semantic label of "Mug." Object 305 is shown to have three attributes 307, 309, 311 that can pertain respectively, for instance, to a location (e.g., kitchen, library), a color (e.g., red mug, blue mug), and shape (e.g., tall, short). This level of granularity allows the mobile robot 100 to perform the MOS task more efficiently and accurately.

In an embodiment, a command module 206 can be communicatively coupled to at least one of the processors 202, and can be configured to receive a language command from a user. The language command can be a natural or grounded language command that identifies at least one target object and at least one location corresponding to the target object. The target object is the item to be found by the robot 100 during execution of the MOS task.

In an embodiment, an update module 208 can be communicatively coupled to at least one processor 202, and can be configured to update the belief associated with the at least one target object in the OO-POMDP model. The belief can be updated based on object-specific observations made by at least one sensor 212. The update module 208 can include an OO-POMCP process to update a belief on a per object distribution basis. The belief can also be updated based on a language command from a user. For example, upon receiving a language command from a human user, such as "Find the mugs in the kitchen and books in the library," the robot 100 can associate the locations (i.e., kitchen, library) to each object class (i.e., mugs, books) to improve its search. In an embodiment, the language commands can be processed by Google's Cloud Speech-to-Text API. The update module 208 can update the belief in the OO-POMDP model to reflect that the target objects are mugs and books, and the corresponding observation spaces within the environment are kitchen and library respectively. The robot 100 will then first search in the kitchen for the mugs and in the library for the books. In an embodiment, the robot can use its Microsoft Kinect 2 sensor to detect the mugs and books having ARTags. However, if the robot fails to find the target objects in the specified locations and updated observation spaces, the robot 100 will then search the remaining portions of the environment for each instance of target objects.

Figure 4:
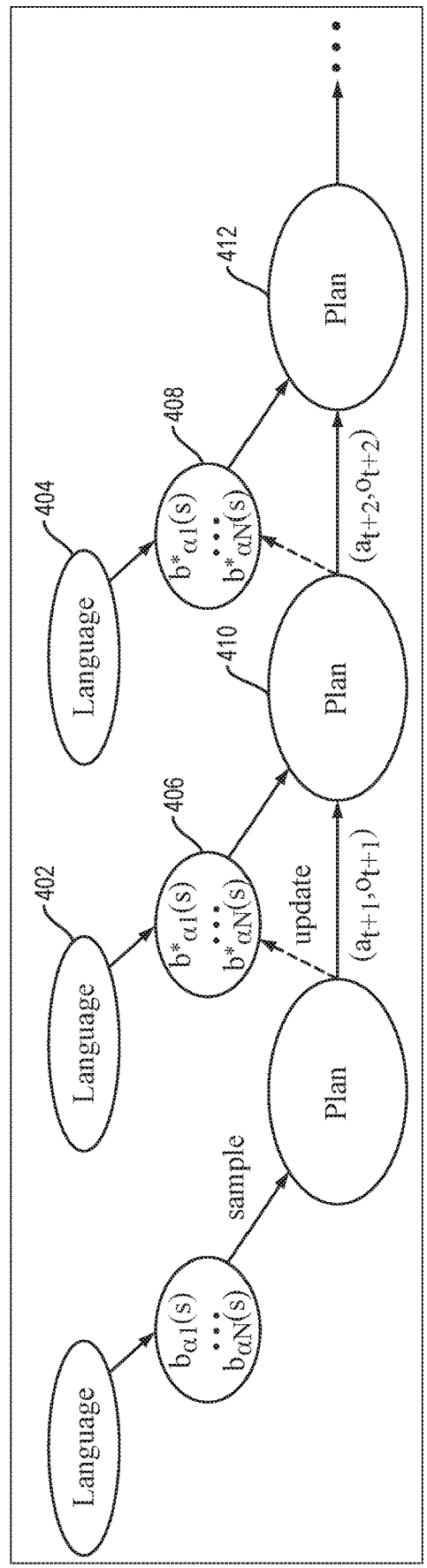
FIG. 4 illustrates an exemplary runtime planning diagram in accordance with an aspect of the present invention.

The command module 206 and update module 208 can further be configured to receive additional language commands, from the user, while the mobile robot 100 is performing the MOS task. For example, and with reference to FIG. 4, in response to receiving additional language commands 402, 404 during runtime, at least one belief 406, 408 can be updated based on the additional language commands 402, 404, and the mobile robot 100 can adjust its plan 410, 412 and search actions in real-time to correspond with the updated belief.

Figure 5:
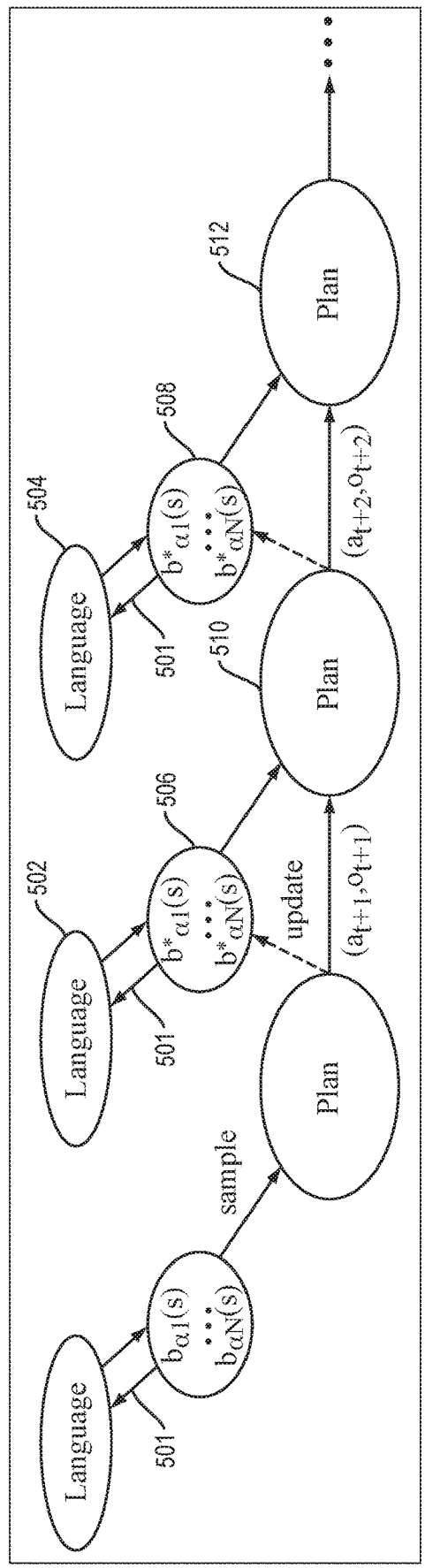
FIG. 5 illustrates an exemplary runtime two-way planning diagram in accordance with an aspect of the present invention.

Referring to FIG. 5, in another embodiment, in response to receiving additional language commands 502, 504 from the user during runtime, the robot can present questions 501 to the user. Based on this two-way interaction between the user and the robot 100, at least one belief 506, 508 can be updated, and the mobile robot 100 can adjust its plan 510, 512 and search actions in real-time to correspond with the updated belief.

In an embodiment, a drive module 210 can be coupled to at least one processor 202 in the mobile robot 100. The drive module 210 can be configured to enable driving the mobile robot 100 to the at least one observation space identified in the updated belief.

Figure 6:
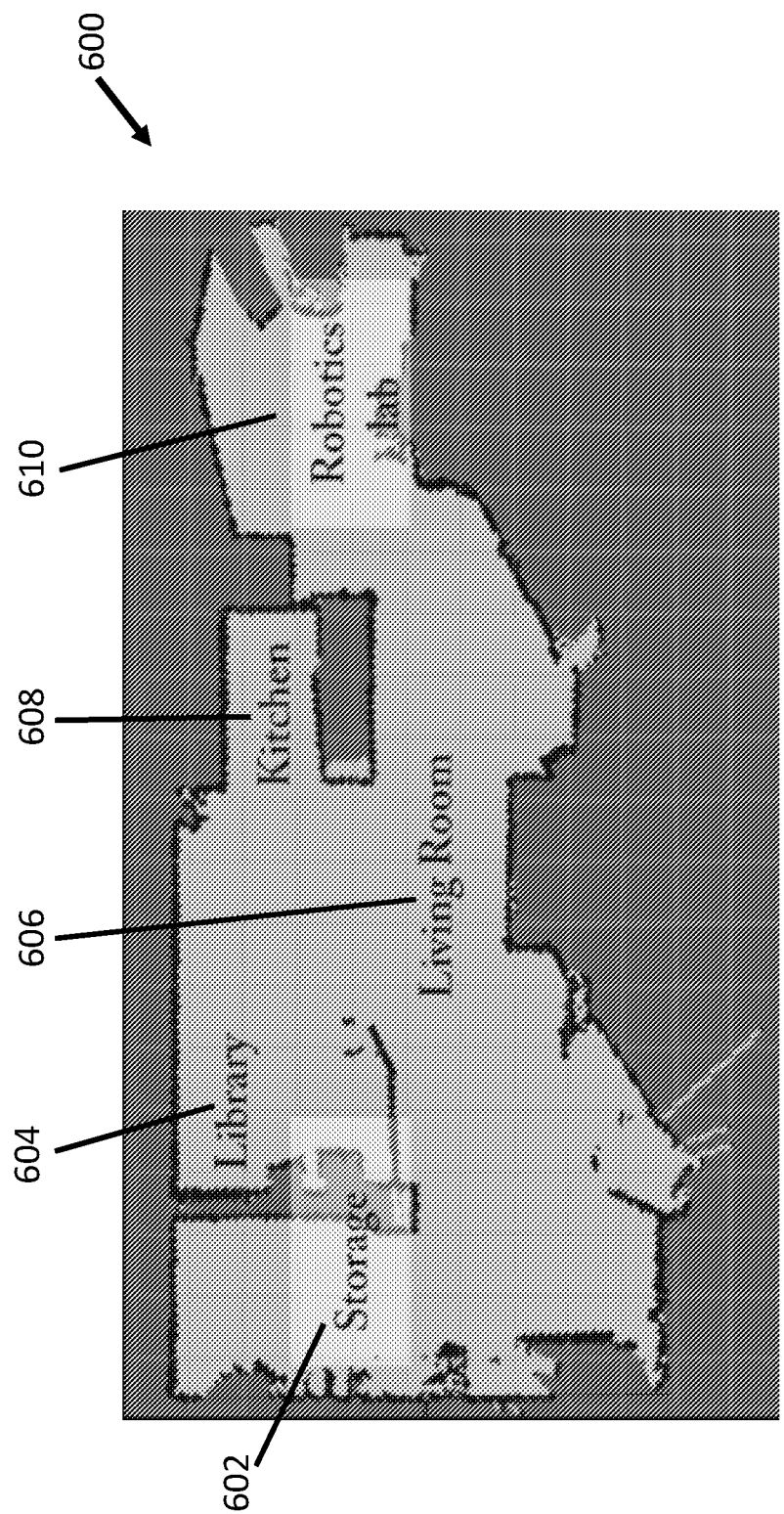
FIG. 6 illustrates a map of an environment for use in accordance with an aspect of the present invention.

Referring to FIG. 6, in an embodiment, at least one map 600 can be stored in the non-transitory computer readable storage medium 204. The map 600 can include an occupancy grid map and a semantic map of the environment. A topological map can be generated by utilizing Rapidly-exploring Random Trees (RRT). In an embodiment, the map 600 can depict various rooms in the environment, such as, a storage room 602, library 604, living room 606, kitchen 608, and robotics lab 610. The map 600 can be utilized by the mobile robot 100 via the processor 202 to traverse and navigate the environment while searching for at least one target object.

In an embodiment, at least one sensor 212 can be coupled to a processor 202 and the mobile robot 100 to enable searching for the target objects, while the mobile robot 100 is traversing the observation space. Each sensor 212 can be configured to provide a sensor signal to the processor 202 upon identifying a location of each target object. The processor 202 can evaluate items identified during search of the observation space based on class and at least one attribute to identify each instance of a target object. Object-specific observations made by the sensor 212 during performance of the MOS task can be utilized by the processor 202 and update module 208 to update the belief pertaining to target objects and observation spaces.

In this specification, an exemplary fan-shaped sensor is described in connection with an embodiment; however, it should be appreciated that a wide variety of sensor technologies can be utilized in combination with, or instead of, the fan-shaped sensor. For example, the sensors 212 can include a complex system of sensors and active or passive beacons, including: radio frequency (RF) sensors, ultrasound sensors, infrared sensors, radio-frequency identification tags and labels (RFIDs), bar code detection sensors, ARTags, sonar sensors, encoded optical retro-reflector detection, machine vision, thermal imaging sensors, and the like.

In an embodiment, additional sensors 212 and technologies can be utilized to enable the robot 100 to efficiently find objects, incorporate information from language commands and operate in real-world environments. For example, a LIDAR (Light Detection and Ranging) can be used for localization and a Microsoft Kinect 2 can be used for object detection. Other object recognition detectors that capture RGB-D can also be utilized. In an embodiment, the robot utilizes Google's Cloud Speech-to-Text API to process the language commands. A Microsoft Kinect 2 sensor can be used to detect target objects, such as, books or mugs having ARTags.

In an embodiment, a notification module 214 can be communicatively coupled to a processor 202 and to at least one sensor 212, and configured to notify the user upon finding each target object. When the sensor 212 identifies a target object and transmits a sensor signal to a processor 202 identifying the location of each target object, the notification module 214, in response, can activate an indicator to notify the user. In various embodiments, the indicator can be configured to provide an audible sound (e.g., buzzer, alarm, siren, ringing, prerecorded voice message), a visual indication (e.g., flashing lights, illuminated lamp, movement or mechanical action by the robot 100), or audiovisual indications. In an embodiment, the notification module 214 can be configured to provide the user with an electronically transmitted notice, such as, an SMS text message.

Referring to FIG. 7A, in one aspect, the present invention features a method of operating (700) a mobile robot to conduct a MOS task within an environment. The mobile robot can include at least one processor that can execute computer readable instructions stored in at least one non-transitory computer readable storage medium to perform various operations including: (a) representing (702) a multi-object search task in an OO-POMDP model having at least one belief pertaining to a state and at least one observation space within an environment of the robot, wherein the state is represented in terms of classes and objects and each object has at least one attribute and a semantic label; (b) receiving (703), at the mobile robot from a user, a language command identifying at least one target object and at least one location corresponding to the target object; (c) updating (704) at least one belief, associated with at least one target object, based on the language command; (d) driving (705) the mobile robot to the at least one location identified in the updated belief, (e) searching (706), using at least one sensor on the mobile robot while traversing the location identified in the updated belief, for the at least one target object; and (f) notifying (707) the user upon finding the at least one target object.

As illustrated in FIG. 7A, in an embodiment, the step of representing (702) an MOS task in an OO-POMDP model can occur prior to the step of receiving (703) a language command and updating (704) a belief, however, in other embodiments, the step of receiving (703) a language command may precede the step of representing (702) a task in the OO-POMDP model.

Referring also to FIG. 7B, in an aspect, the method of operating (700) a mobile robot can further include receiving (708), from the user, additional language commands at any time during performance of the task, for instance, during the steps of driving (705) and searching (706), and in response updating (709) the belief based on the additional language commands and adjusting course of driving and searching to match the updated belief. Searching (706) can include evaluating items in the observation space based on class and at least one attribute to identify each instance of the target object.

In an aspect, updating (709) the at least one belief can include utilizing an OO-POMCP process to update the at least one belief on a per object distribution basis. Updating the belief can further include updating (710) the at least one belief based on object-specific observations made by the at least one sensor. The step of searching (706) can include searching until failing to find the target object in the at least one location identified in the updated belief, and then searching (712) the entire environment for each instance of the target object. The step of notifying (707) the user upon finding the target object can include notifying (713) the user by providing an audible, visual, audiovisual, mechanical action, or electronically transmitted indication. The step of driving (705) the mobile robot can include operating a drive mechanism of the mobile robot to traverse and navigate the environment as represented in at least one map stored in the non-transitory computer readable storage medium.

Figure 7C:
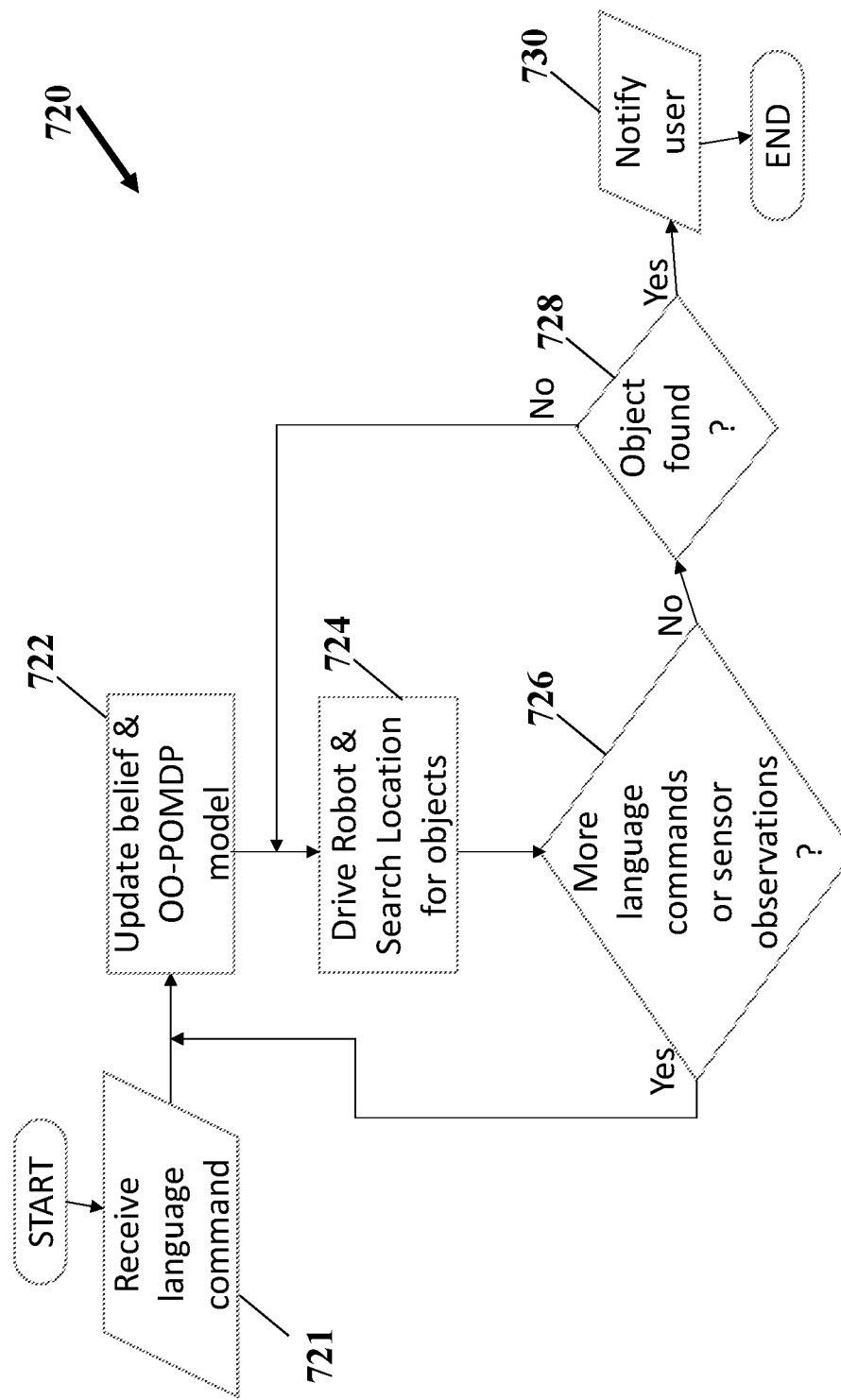
FIG. 7C is a flowchart illustrating an exemplary embodiment in accordance with the present invention.

Referring to FIG. 7C, flowchart 720 illustrates an exemplary scenario of the robot in operation. Upon receiving (721) a language command from a user, the robot can respond by updating (722) at least one belief pertaining to a target object and an associated location identified by the language command. The robot can then begin driving and searching (724) the specified location for the target object. Upon receiving (726) any additional language commands from the user and/or sensor observations (from at least one sensor) while driving and searching (724), the robot can respond by again updating the belief based on the additional language commands and sensor observations and adjusting its course to continue searching (724) for the target object. Upon finding (728) the target object, the robot can notify (730) the user accordingly.

Referring to FIG. 8A, in another aspect, the present invention features a method of operating (800) a mobile robot to perform a task. The mobile robot can include at least one processor executing computer readable instructions stored in at least one non-transitory computer readable storage medium to perform various operations including: (a) representing (802) a task in an OO-POMDP model having at least one belief pertaining to a state and at least one observation space within an environment of the robot, wherein the state is represented in terms of classes and objects and each object has at least one attribute and a semantic label; (b) receiving (803), at the mobile robot from a user, a language command identifying at least one target object and at least one location corresponding to the target object; (c) updating (804) the at least one belief, associated with the at least one target object, based on the language command; (d) generating (805) at least one action based on the language command and the updated belief, and (e) executing (806) the at least one action.

As illustrated in FIG. 8A, in an embodiment, the step of representing (802) a task in an OO-POMDP model can occur prior to the step of receiving (803) a language command and updating (804) a belief, however, in other embodiments, the step of receiving (803) a language command may precede the step of representing (802) a task in the OO-POMDP model.

Referring to FIG. 8B, in an aspect, the step of executing (806) the at least one action can include: driving (807) the mobile robot to the at least one observation space identified in the updated belief, searching (808), using at least one sensor on the mobile robot while traversing the at least one observation space identified in the updated belief, for the at least one target object; and notifying (809) the user upon completion of the task.

In another aspect, the present invention provides a computer program that can be stored on at least one non-transitory computer readable medium, and the computer program can be configured to operate a robot. When the computer program is executed by at least one processor on a robot, the computer program causes the robot to perform various operations including: (1) storing at least one belief pertaining to a state and at least one observation space within an environment of the robot, wherein the state is represented in terms of classes and objects and each object has at least one attribute and a semantic label; (2) receiving from a user a language command identifying at least one target object and at least one location corresponding to the target object; (3) updating the at least one belief, associated with the at least one target object, based on the language command; (4) driving the mobile robot to the at least one observation space identified in the updated belief, (5) searching, using at least one sensor on the mobile robot while traversing the at least one observation space identified in the updated belief, for the at least one target object; and (6) notifying the user upon finding the at least one target object.

TECHNICAL APPROACH

One difficulty for POMDPs is scaling to multiple objects where the belief space becomes unmanageable. Planning with large belief spaces in POMDPs has been addressed by estimating the belief via sampling, compressing the belief space into a more tractable lower-dimensional subspace, or defining the belief only over components of the state relevant for decision-making. OO-POMDPs overcome this challenge by factorizing the belief into independent object components.

OO-POMDPs extend Object-Oriented Markov Decision Processes (OO-MDPs) to POMDPs by factorizing both state and observation spaces in terms of objects. OO-MDPs use object state abstractions to enable the agent to reason about objects and relations between objects.

A POMDP is defined as a 7-tuple $(S, A, T, R, \gamma, \Omega, O)$. The state $s \in S$ contains all task-relevant information for decision-making. An agent selects actions $a \in A$ resulting in a next state s' defined by the transition function: $T(s', a, s) = p(s'|s, a)$. Execution of an action yields an observation $z \in \Omega$ derived by the observation function $O(z, s', a) = p(z|s', a)$. The reward of each action is defined by the reward function R with discount factor $\gamma$. The agent maintains a belief, b, which is a probability distribution over possible states in S that the agent could be in. Taking an action a and receiving an observation z results in a new belief b' for a particular next state via a belief update.

To overcome the shortcomings of POMDPs, the MOS task can be represented in an improved OO-POMDP model or framework. The task objective is for an agent to find the location of n object instances (target objects), which are situated among a set of possible object locations in an environment. In an embodiment, the layout of the environment may be known, but in other embodiments the layout of the environment may be initially unknown. Each object belongs to some class $c \in C$. The OO-POMDP framework provides structure for factorizing the belief into independent object-specific components $b_0$. In turn, each $b_0$ update is more manageable compared to updating the full belief, thereby supporting efficient inference. The present invention provides two new contributions that exploit this factorization: 1) Observations from language commands, and 2) OO-POMCP algorithm.

MOS OO-POMDP

The MOS task can be formulated as an OO-POMDP which supports convenient representation of robotic tasks that require reasoning about multiple objects under uncertainty. As with a conventional object-oriented programming language, there are two levels of organization in an OO-POMDP: classes and objects. An OO-POMDP is represented as a 10-tuple $(C, ATT(c), DOM(a), Obj, A, T, R, \gamma, \Omega, O)$.

In an OO-POMDP, the state space, S and observation space, $\Omega$, can be factored into a set of objects $Obj = \{obj_1, \ldots, obj_n\}$. Each object $obj_i$ is an instance of a particular class, $c \in C$ that consists of a set of class-specific attributes $Att(c) = \{ca_1, \ldots, ca_m\}$. Each attribute $a \in Att(c)$ has a domain of possible values $Dom(a)$. The dual-factorization of S and $\Omega$ allows the observation function to exploit shared structure so as to define observations grounded in the state with varying degrees of specificity: over a class of objects, a single object, or an object's attribute.

The state of the MOS OO-POMDP is decomposed into the state of the robot $s_r$ and the state of objects $s_{obj}$. The state of n objects is defined as: $s = \cup_{i=1}^{n} s_i$, where $s_i$ encodes the cell containing the object as a one-hot vector.

In an embodiment, three maps can be utilized: an occupancy-grid map $M_o$, a semantic map $M_s$, and a topological map $M_t$. In some embodiments, $M_o$ and $M_s$ may be given. $M_o$ can be a m×m grid that marks each grid cell as empty or occupied by fixed, static structures such as walls, while $M_s$ maps from grid cells to a single room in a set of rooms R. $M_t$ provides a sparse graph representation of $M_o$ for navigation. The number of cells considered for navigation can be reduced using $M_t$ by applying the RRT algorithm on $M_o$. In the center of each room, RRT can be run for a fixed time interval, which constructs a star-like graph. Each node is a sparsely sampled cell in $M_o$ and each edge is a path between nodes. Any edge that is shorter than D is rejected for sparsity, D being the depth of the fan-shaped sensor region. An off-the-shelf planner computes a navigation policy per edge for traversing between nodes. All room centers are connected to each other by additional edges.

The OO-POIDP components can be defined as follows:
C: the object classes such as Robot, Mug, and Key.
ATT(c): all classes contain the attribute of the (X, Y)-location.
DOM(a): the range of the (X, Y)-location is the set of all possible locations, L, consisting of all cells in rooms.
Obj: the set of objects. Obj excludes the agent, is finite (with known cardinality n), and fixed in advanced.
A: Look(d) projects a fan-shaped sensing region of depth D in one of the four cardinal directions d; Find(l) marks a single location l as containing an object; Move(e) moves an agent to a connected node via edge $e \in M_t$; Move(r) moves an agent to an adjoining room $r \in M_s$.
T: All actions are assumed to be deterministic.
R: the agent receives for each object +1000 for Find(l) if l corresponds to an object's true location and −1000 if incorrect. All other actions get −10. Move actions receive an extra cost of the Euclidean distance from the start to end location. The experiment task ends after n Find actions.
O and $\Omega$ are defined in a later section below. They consist of language observations and direct object observations from a sensor, such as the fan-shaped sensor located on the robot.

Beliefs over Multiple Objects

In an embodiment, OO-POMDPs can be configured to efficiently manage a belief distribution that scales with multiple objects. In the MOS OO-POMDP, uncertainty is defined over L possible object locations. The state space grows exponentially with the number of objects: $|S| = \Pi_{i=1}^{n} |_{obj_i} |L|^2$, where $S_{obj_i}$ denotes the state space of object $obj_i$. A POMDP planner must reason over beliefs with dimension equal to the size of the state space.

In an embodiment, the objects are assumed independent, thereby allowing the belief b to be factored into n components, each defined over the state space of a particular object $obj_i$: $b = \Pi_{i=1}^n b_i$.

This independence assumption enables the size of the belief to scale linearly in the number of objects. While the dimension of the unfactored belief is $|L|^2$, the dimension of the factored belief is $n|L|$. A core technical contribution of OO-POIDPs is to provide structure for defining object-specific observations $z_i$, restricted to a component of the state $s_i \in S_{obji}$, to support such a factorization. The belief for object i can be updated by: $b_i'(s_i) = \eta p(z_i|s_i) b_i(s_i)$, where $z_i$ denotes an observation for object i and $\eta$ is a normalization factor. The observation $z_i$ is an observation by the sensor $z_i^s$ or by the language command $z_i^l$. While $z_i^s$ is received throughout agent planning, in an embodiment, an initial language command yields $z_i^l$ only once at the beginning of each task. In other embodiments, additional language commands yield $z_i^l$ each time a language command is made anytime during performance of each task.

Observations from Language Commands

Observations in an OO-POMDP can reference a class, object, or attribute while directly mapping to the state. In an embodiment, the belief can be selectively updated via object specific observations afforded by language observations.

Given a scenario in which a human operator tells the robot: "The mugs are in the kitchen, and the books are in the library." A keyword language model can map words in the language command into a set of classes and room labels. A language command can be represented by a set of pairs ($c_i$, $R_i$), where $c_i \in C$ is a class of objects and $R_i$ is a set of cells in the referenced rooms.

A statement ($c_i$, $R_i$) can be encoded as an observation by $z_i^l \in [0,1]^{m^2}$, where each element $z_{ik}^l$ represents the probability that object i occupies the cell j. Error as a result of the robot misinterpreting the human command or the human commanding the robot to the wrong room can be captured by the term $\psi$ below. Formally:

$$z_{ij}^l = \begin{cases} \frac{(1-\psi)}{A} & \text{if the cell } j \in R_i \\ \frac{\psi}{m^2 - A} & \text{otherwise} \end{cases},$$

where A is the number of cells in the referenced rooms and $\psi$ is a small value between 0 and 1. For objects that are referenced but without rooms (i.e. $R_i = \Pi$), $z_{ij}^l = 1/m^2$ for all j. Given that object i is in location $s_i$, the probability of z is simply their dot product: $p(z_i^l|s_i) = s_i \cdot z_i^l$. Thus the agent's belief for i can be updated with $z_i^l$ alone.

Whereas the initial belief can be assumed to be a uniform distribution, a language observation updates each $b_i$ object distribution, resulting in a modified belief that is sensitive to the knowledge of the human operator. A human operator may possess general knowledge (e.g., that mugs tend to be in the kitchen) as well as domain-specific knowledge (e.g., in my house mugs also tend to be in the bathroom).

Fan-Shaped Sensor Model

In an embodiment, the observation model for the sensor can be notated as: $p(z^s|s)$. The sensor can be modeled as a discretized fan-shaped sensing region, V, with a limited field of view and depth D. Observations from the sensing region, $z^s$, consist of n object-specific observations $z_i^s \in v \cup \{NULL\}$. If object i is not detected by the sensor, $z_i^s = NULL$. Otherwise, $z_i^s$ is the location where object i is detected in V.

Each $z_i^s$ can be obtained from one of three mutually exclusive and exhaustive events, $A_i$, $B_i$, and $C_i$. Let the event $A_i$ be $z_i^s \in v$ and $z_i^s$ is from the object i. Let the event $B_i$ be $z_i^s \in v$ and $z_i^s$ is from other sources. Thus $p(z_i^s|s)$ can be decomposed as follows:

$$p(z_i^s|s) = \Sigma_{e_i \in \{A_i, B_i, C_i\}} p(z_i^s|e^i, s) p(e_i|s).$$

If event A occurs, the observation is normally distributed with pi being the true object i position: $p(z_i^s|A_i, s), \eta' \cdot (z_i^s|\mu_i, \Sigma_i)$, for $z_i^s \in v$. The covariance matrix is defined by $\Sigma_i = \sigma^2 I^{2 \times 2}$ and $\eta'$ is the normalization factor. If event B occurs, the false positive detection could have come equally likely from any location in:

$$V : p(z_i^S | B_i, s) = \frac{i}{|\mathcal{V}|}, \text{ if } z_i^s \in \mathcal{V}.$$

If event C occurs, $z_i^s$ should be always NULL and $p(z_i^s = NULL | C_i, s) = 1$.

The probability of the events can be defined as $p(A_i|s) = \alpha_i$, $p(B_i|s) = \beta_i$, $p(C_i|s) = \gamma_i$, where $\alpha_i + \beta_i + \gamma_i = 1$. These parameters can be defined differently depending on whether the object i is in the sensing region or not:

$$(\alpha_i, \beta_i, \gamma_i) = \begin{cases} \left(\in, \frac{1-\in}{2}, \frac{1-\in}{2}\right) & \text{if the object } i \text{ is in } V \\ \left(\frac{1-\in}{2}, \frac{i-\in}{2}, \in\right) & \text{if the object } i \text{ is not in } V \end{cases},$$

where $\in$ acts to define the overall accuracy of the sensor. A perfect detector can be modeled with $\sigma = 0$, $\in = 1$.

OO-POMCP Algorithm

Partially Observable Monte-Carlo Planning is a well-known online POMDP planning algorithm that has demonstrated success in scaling to large POMDPs. POMCP applies Monte-Carlo Tree Search (MCTS) to POMDPs to estimate both the Q-value for selecting a real action and the next belief. In Algorithm 1, shown below, the two functions SIMULATE and ROLLOUT are part of POMCP, and the functions SAMPLE and UPDATE pertain to OO-POMCP. It should be noted that the crossed-out text in SIMULATE function denotes removal from POMCP.

Algorithm 1 OO-POMCP

| | |
|---|---|
| b ← Prior | function SAMPLE(b) |
| s ← InitialState | for 0 ∈ Obj do |
| for i = to ACTIONS do | $\hat{s}_o \cdot bo$ |
|   T ← { } | return $Us_o$ |
|   for j = 0 to SIMULATIONS do | |
|     ŝ ← SAMPLE(b) | function SIMULATE(s, h, depth) |

-continued

Algorithm 1 OO-POMCP

SIMULATE($\hat{s}$),{ }, 0)  
  $\alpha \leftarrow \arg\max_{\alpha} V(ha)$  
  (s', z, r) $\leftarrow \varepsilon(s, \alpha)$  
  b $\leftarrow$ UPDATE(b, a, z)  
  s $\leftarrow$ s'  
  if TerminationCondition( ) then break function UPDATE(b, a, z)  
  for o $\in$ Obj do $b_o'(s') \leftarrow \eta O(z|s', \alpha) \sum_{s \in s} T(s'|\alpha,s) b_o(s)$ return $\Pi^b{}_o'(s')$ if $\gamma^{depth} > \in$ then return 0  
if h $\notin$ T then  
  for all $\alpha \in$ A do  
    T(h$\alpha$) $\leftarrow$ >$N_{init}$(h$\alpha$), $V_{init}$(h$\alpha$))  
  return ROLLOUT(s, h, depth)  
$\alpha \leftarrow$ selectMaxAction( )  
(s', z, r) ~ G(s, $\alpha$)  
R $\leftarrow$ r + y · SIMULATE(s', h$\alpha$o, depth+ 1)  
~~B(h) $\leftarrow$ B(h) ∪ {s}~~

T(h$\alpha$) $\leftarrow$ $\left(N(h\alpha) + 1, V(ha) + \dfrac{R - V(ha)}{N(ha)}\right)$ return R Algorithm 1 Partially Observable Monte-Carlo Planning procedure SEARCH(h)  
  repeat  
    if h = empty then  
      s ~ I  
    else  
      s ~ B(h)  
    end if  
    SIMULATE(s, h, 0)  
  until TIMEOUT$_0$  
  return $\arg\max_b V(hb)$ end procedure procedure ROLLOUT(s, h, depth)  
  if $\gamma^{depth} < \in$ then  
    return 0  
  return 0  
  end if  
  $\alpha \sim \pi_{rollout}(h, \cdot)$  
  (s',o, r) ~ G(s,$\alpha$)

return r + $\gamma$·ROLLOUT(s', h$\alpha$o , depth+1)  
end procedure procedure SIMULATE(s, h, depth)  
  if $\gamma^{depth} < \in$ then  
    return 0  
  end if  
  if h $\notin$ T then  
    for all $\alpha \in$ A do  
      T(h$\alpha$) $\leftarrow$ ($N_{init}$(h$\alpha$), $V_{init}$h$\alpha$), 0)  
    end for  
    return ROLLOUT$_{(s, h, depth)}$  
  end if $\alpha \leftarrow \arg\max_b V(hb) + c\sqrt{\dfrac{\log N(h)}{N(hb)}}$ (s',o, r) ~ G(s ,$\alpha$)  
  R $\leftarrow$ r + $\gamma$·SIMULATE(s', h$\alpha$o, depth+ 1)  
  B(h) $\leftarrow$ B(h) $\cup$ {s}  
  N(h) $\leftarrow$ N (h) + 1  
  N(h$\alpha$) $\leftarrow$ N(h$\alpha$) + 1

$V(ha) \leftarrow V(ha) + \dfrac{R - V(ha)}{N(ha)}$ return R  
end procedure

OO-POMCP differs from POMCP in its representation of the belief as a collection of independent object distributions, $b_0$, as manifested in the functions SAMPLE and UPDATE in Algorithm 1. More importantly, OO-POMCP does not estimate the next belief b' while estimating the Q-values but performs a full belief update, reflected in UPDATE, by exactly updating each of the more manageable object components. Details of the OO-POMCP algorithm and its improvements are as follows.

A forward search tree T is constructed each decision cycle by iteratively sampling particles, $\hat{s}$, from the current belief for SIMULATE. Each node in the tree, T, represents a particular sequence of action and observations called a history h×{$a_1, z_1, \ldots, a_1, z_1$}. T(h) contains a value estimate of h calculated by the sum of discounted rewards encountered in h, V(h), divided by the number of times h was visited N(h):

$$V(h) = \dfrac{\sum R_i}{N(h)},$$

$R_i = \sum_{k=t}^{\infty} \gamma^k r_k$.

Histories in the tree are sampled by recursively calling the function SIMULATE with a black-box simulator, G(s, a). If a history has not been encountered, then it can be initialized and added to the tree; otherwise each sampled history adds the discounted reward and increments its count. After a fixed number of simulations, the maximum estimated Q-value V(ha) can be selected from the tree to execute a real action in the environment E(s, a), yielding a real observation to update the belief to give b', and ending the decision cycle.

POMCP estimates the next belief b' while sampling histories: B(h)$\leftarrow$B(h)$\cup${s}. The belief B(h) is a multiset of particles (e.g. {$s_1, s_2, s_1 \ldots$}), which implicitly captures the frequency of a given particle. B(h) is stored for each next action-observation pair. After an action is chosen and executed, the belief update occurs by setting b' directly to be the B(h) of the action-observation pair that corresponds to the true executed action and resulting observation. OO-POMCP, in contrast, separates belief estimation and Q-value estimation into two separate processes. Like POMCP, OO-POMCP samples particles from each object distribution in SAMPLE to perform SIMULATE and estimate Q-values. However, OO-POMCP then performs an explicit, exact belief update (outside of constructing T) per object distribution $b_0$ in UPDATE. This is possible because it is computationally tractable to represent each $b_0$ in the factored belief.

One shortcoming of POMCP is failing to sufficiently approximate a large b'. In MOS the joint belief grows exponentially as the number of objects increases. Furthermore, the difficulty of sampling enough particles in POMCP is compounded because many particles are rejected. The probability of keeping a particle consistent with the correct action-observation pair is $$\lambda = \frac{1}{|A||\Omega|}$$

when assuming a uniform distribution over action-observation pairs, but for rare action-observation pairs $\lambda$ is strictly less.

Small values of $\lambda$ result in particle decay: gradually losing particles when recomputing b' over successive planning cycles. Particle decay can be harmful when b' does not contain the true environment state, resulting in suboptimal behavior, and fatal when no samples exist to represent the next belief (because all were rejected after encountering a rare observation), resulting in random behavior. One partial solution is to resample K particles per planning cycle, known as particle reinvigoration; however, this cannot recover from cases where the true environment state is no longer in b'.

An explicit belief update in OO-POMCP, however, guarantees that b' is computed according to the true action-observation pair, thereby eliminating particle decay. This allows OO-POMCP to plan in a robust fashion. A factored belief, furthermore, allows for greater sample efficiency because $|S_{obj_j}|$n particles can be represented by $n|S_{obj_j}|$ particles within a factored belief for n objects. OO-POMCP extends POMCP to support robust planning and sample efficiency while scaling to domains with many objects.

Alternative Configurations and Implementations

In this description, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

A tangible, non-transitory computer storage medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The instructions may be embodied in digital and analog communication links for electrical, optical, acoustical or other forms of propagated signals, such as carrier waves, infrared signals, digital signals, etc.

In general, a machine readable medium includes any mechanism that provides (i.e., stores and/or transmits) information in a form accessible by a machine (e.g., a computer, network device, personal digital assistant, manufacturing tool, any device with a set of one or more processors).

In various embodiments, hardwired circuitry may be used in combination with software instructions to implement the techniques. Thus, the techniques are neither limited to any specific combination of hardware circuitry and software nor to any particular source for the instructions executed by the data processing system.

While example embodiments have been particularly shown and described, it will be understood by those skilled in the art that various changes in form and details may be made therein without departing from the scope of the embodiments encompassed by the appended claims. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A method of operating a mobile robot to conduct a multi-object search task, the mobile robot having at least one processor executing computer readable instructions stored in at least one non-transitory computer readable storage medium to perform operations comprising:
representing a multi-object search task in an Object-Oriented Partially Observable Markov Decision Process model having at least one belief pertaining to a state and at least one observation space within an environment of the robot, wherein the state is represented in terms of classes and objects and each object has at least one attribute and a semantic label;
receiving, at the mobile robot from a user, a language command identifying at least one target object and at least one location corresponding to the target object;
updating the at least one belief, associated with the at least one target object, based on the language command;
driving the mobile robot to the at least one observation space identified in the updated belief;
searching, using at least one sensor on the mobile robot while traversing the at least one observation space identified in the updated belief, for the at least one target object; and
notifying the user upon finding the at least one target object.

2. The method of claim 1, further comprising receiving, at the mobile robot from the user, additional language commands during the steps of driving and searching, and in response updating the belief based on the additional language commands and adjusting course of driving and searching to match the updated belief.

3. The method of claim 1, wherein updating the at least one belief includes utilizing an Object-Oriented Partially Observable Monte-Carlo Planning process to update the at least one belief on a per object distribution basis.

4. The method of claim 1, further comprising updating the belief based on object-specific observations made by the at least one sensor.

5. The method of claim 1, wherein searching includes evaluating items in the observation space based on class and at least one attribute to identify each instance of the target object.

6. The method of claim 1, further comprising, upon failing to find the target object in the at least one observation space identified in the updated belief, searching the environment for each instance of the target object.

7. The method of claim 1, wherein notifying the user upon finding the target object includes providing an audible, visual, audiovisual, or electronically transmitted indication.

8. The method of claim 1, wherein driving the mobile robot further comprises operating a drive mechanism of the mobile robot to traverse and navigate the environment as represented in at least one map stored in the non-transitory computer readable storage medium.

9. A system comprising:
a mobile robot having at least one processor configured to execute computer readable instructions stored in at least one non-transitory computer readable storage medium to perform a multi-object search task;
a representation of a multi-object search task in an Object-Oriented Partially Observable Markov Decision Process model having at least one belief pertaining to a state and at least one observation space within an environment of the robot, wherein the state is represented in terms of classes and objects and each object has at least one attribute and a semantic label;
a command module communicatively coupled to the at least one processor and configured to receive from a user, a language command identifying at least one target object and at least one location corresponding to the target object;
an update module communicatively coupled to the at least one processor and configured to update the at least one belief, associated with the at least one target object, based on the language command;
a drive module coupled to the mobile robot and configured to enable driving the mobile robot to the at least one observation space identified in the updated belief;
at least one sensor coupled to the mobile robot, the at least one sensor configured to search and provide a sensor signal to the at least one processor upon finding the at least one target object; and
a notification module communicatively coupled to the processor and configured to notify the user upon finding the at least one target object.

10. The system of claim 9, wherein the command module is configured to receive additional language commands from the user while the mobile robot is performing the multi-object search task, and in response updating the at least one belief based on the additional language commands and adjusting course of the mobile robot to match the updated belief.

11. The system of claim 9, further comprising an Object-Oriented Partially Observable Monte-Carlo Planning module configured to update the at least one belief on a per object distribution basis.

12. The system of claim 9, wherein the belief is updated based on object-specific observations made by the at least one sensor.

13. The system of claim 9, wherein the processor evaluates items identified during search of the observation space based on class and at least one attribute to identify each instance of the target object.

14. The system of claim 9, wherein upon failing to find the at least one target object in the at least one observation space identified in the updated belief, the mobile robot searches the environment for each instance of the at least one target object.

15. The system of claim 9, wherein the notification module is configured to initiate an audible, visual, audiovisual, or electronically transmitted indication upon finding the at least one target object.

16. The system of claim 9, further comprising at least one map stored in the non-transitory computer readable storage medium, the map utilized by the mobile robot to traverse and navigate the environment as represented in the at least one map.

17. The system of claim 9, wherein the mobile robot is configured as a search and rescue robot, a rover, a service robot, a drone, an underwater robot, or any combination thereof.

18. A method of operating a mobile robot to conduct a task, the mobile robot having at least one processor executing computer readable instructions stored in at least one non-transitory computer readable storage medium to perform operations comprising:
- representing a task in an Object-Oriented Partially Observable Markov Decision Process model having at least one belief pertaining to a state and at least one observation space within an environment of the robot, wherein the state is represented in terms of classes and objects and each object has at least one attribute and a semantic label;
- receiving, at the mobile robot from a user, a language command identifying at least one target object and at least one location corresponding to the target object;
- updating the at least one belief, associated with the at least one target object, based on the language command;
- generating at least one action using the language command and the updated belief, and executing the at least one action.

19. The method of claim 18, wherein executing the at least one action includes:
- driving the mobile robot to the at least one observation space identified in the updated belief;
- searching, using at least one sensor on the mobile robot while traversing the at least one observation space identified in the updated belief, for the at least one target object; and
- notifying the user upon completion of the task.

20. A computer program, embodied on at least one non-transitory computer readable medium, the computer program, when executed by a robot having at least one processor, causes the robot to perform operations comprising:
- storing at least one belief pertaining to a state and at least one observation space within an environment of the robot, wherein the state is represented in terms of classes and objects and each object has at least one attribute and a semantic label;
- receiving a language command from a user, the language command identifying at least one target object and at least one location corresponding to the target object;
- updating the at least one belief, associated with the at least one target object, based on the language command;
- driving the mobile robot to the at least one observation space identified in the updated belief;
- searching, using at least one sensor on the mobile robot while traversing the at least one observation space identified in the updated belief, for the at least one target object; and
- notifying the user upon finding the at least one target object.

* * * * *